Patented July 10, 1945

2,380,142

UNITED STATES PATENT OFFICE 2,380,142

HYDROGENATED KETONE RESINS

Seaver A. Ballard, Berkeley, and Vernon E. Haury, El Cerrito, Calif., assignors to Shell Development Company, San Francisco, Calif., a corporation of Delaware No Drawing. Application April 26, 1943,
Serial No. 484,654

17 Claims. (Cl. 260—64)

This invention relates to hydrogenated ketone resins and to a process for their preparation. More particularly, the invention pertains to the resins obtained by hydrogenating the resinous condensation product of an aldehyde with a member of a class of higher, unsaturated ketones.

In copending application, Serial No. 337,686, filed May 28, 1940, of one of us, is described a class of condensation products prepared by reacting or condensing an aldehyde with an unsaturated ketone containing at least 12 carbon atoms and preferably at least two olefinic linkages per molecule. These products which are resinous in character possess certain advantageous properties, but also have a tendency to discolor or darken when subjected to heat.

It is therefore an object of the present invention to provide a method of treating such resins whereby their stability against discoloration is improved.

Another object is to provide a treatment which gives resins of improved color properties without detrimentally affecting certain desirable properties possessed by the parent resins such as solubility in a variety of organic solvents and compatibility with other resinous materials and plastic products.

A further object is to provide a new class of useful resins having improved heat and color stability.

These and other objects will be apparent from the description of the invention given hereinafter.

We have discovered that by subjecting the ketone-aldehyde condensation resins to catalytic hydrogenation, the products have both improved color and improved stability towards discoloration when subjected to heat as compared to the untreated resins. It was further found that although the hydrogenated resin has a slightly lower softening or melting point, the excellent compatibility and solubility properties of the product are not adversely affected by the treatment.

The resinous ketone-aldehyde condensates which are treated according to the method of the present invention are condensation products of an aldehyde with a particular type of unsaturated ketone. The unsaturated ketones are side chain substituted cyclohexen-2-ones having at least one olefinic linkage present in a side chain. The exact structure or chemical configuration of these unsaturated ketones is not known although it is realized that they are unsaturated monoketones which are substituted cyclohexenones with the olefinic linkage present in the ring in the $\Delta^2$ position and with at least one olefinic linkage contained in a side chain linked to the ring. The presence of at least two olefinic linkages in the unsaturated ketones is responsible for the resins obtained by condensing the ketones with aldehydes to absorb or combine with oxygen resulting in a valuable change in solubility characteristics as disclosed in copending application having Serial No. 337,686.

The simplest member of the class of unsaturated ketones are termed xylitones by the art. The xylitones, of which there are several isomeric compounds, are tetramer condensates of acetone of the formula $C_{12}H_{18}O$. In addition to the xylitones, other higher auto-condensation products of acetone are suitable such as condensates which are pentamers, hexamers, heptamers, etc. Furthermore, other unsaturated ketones derived by auto-condensation of lower aliphatic ketones which are at least tetramers of such ketones are also used in obtaining the resinous products by condensation with aldehydes. Such unsaturated ketones include what may be termed the homoxylitones of methyl ethyl ketone, the homoxylitones of methyl propyl ketone, the homoxylitones of diethyl ketone, etc., all of which are tetramer auto-condensates of the parent, lower ketones. If desired, the higher and more complex auto-condensates can be employed such as the pentamer, hexamer, heptamer, etc. These unsaturated ketones are crotonaldehyde-type of auto- or self-condensation products of lower aliphatic ketones and are prducts or by-products obtainable by certain methods of condensation which are described in U. S. Patent 2,309,650 and copending application, Serial No. 474,060, filed January 28, 1943.

In this application, the terms "tetramer," "pentamer," "hexamer," etc., refer to the number of molecules of a lower ketone which have been combined to form a molecule of auto-condensate by crotonaldehyde-type of condensation. Thus xylitone, which is formed by condensation of four molecules of acetone to form a molecule of the product, is termed the tetramer auto-condensate of acetone and, for convenience and lack of a better name, the product obtainable by combination of five molecules of acetone is referred to as the pentamer auto-condensate of acetone. Similarly, the auto-condensate from six molecules of other ketones than acetane such as methyl ethyl ketone is termed the hexamer auto-condensate of the parent ketone. The terms are used to indicate the character of the higher auto-condensation products wherein the exact configuration of the atoms or chemical structure is unknown.

The lower aliphatic ketones employed in forming the unsaturated ketones by crotonaldehyde-type of auto-condensation include such representative compounds as acetone, methyl ethyl ketone, methyl propyl ketone, methyl isopropyl ketone, diethyl ketone, methyl butyl ketone, methyl isobutyl ketone, methyl pentyl ketone, dipropyl ketone, ethyl butyl ketone, methyl heptyl ketone, etc. In addition, intermediate auto-condensates like mesityl oxide can be subjected to crotonaldehyde-type of condensation to yield 12 carbon atom xylitone as well as higher multiple-unsaturated products containing 18, 24 and 30 carbon atoms. Condensation of homomesityl oxides of the other lower aliphatic ketones are similarly suitable. By "crotonaldehyde-type" of condensation used in this specification reference is made to that type of condensation which occurs when two molecules of acetaldehyde couple with elimination of a molecule of water forming a molecule of crotonaldehyde as distinguished from aldol-type of condensation which involves coupling of two molecules of acetaldehyde with no formation or elimination of a molecule of water in the reaction which gives a molecule of aldol.

While the resin treated according to the present invention has been described as being formed by reaction of an aldehyde with a substituted $\Delta^2$ cyclohexenone of the indicated class, the resin can be formed from mixtures of the ketones including structural isomers within the class as well as mixtures which contain different numbers of carbon atoms.

All of the class of unsaturated ketones which are tetramer or higher auto-condensates of lower aliphatic ketones have in common the characteristic structure of being substituted $\Delta^2$ cyclohexenones. Although the compounds are not simply homologues of isophorone and homisophorones, the class does possess an orderly regularity of structure. This may be illustrated by consideration of the auto-condensates of acetone, methyl ethyl ketone and methyl propyl ketone given in the following table together with the general formula for each series wherein $m$ is an integer of at least 4 and $n$ is related to $m$ by the indicated equation.

| Auto-condensate | Acetone | Methyl ethyl ketone | Methyl propyl ketone |
|---|---|---|---|
| Tetramer | $C_{12}H_{18}O$ | $C_{16}H_{26}O$ | $C_{20}H_{34}O$ |
| Pentamer | $C_{15}H_{22}O$ | $C_{20}H_{32}O$ | $C_{25}H_{42}O$ |
| Hexamer | $C_{18}H_{26}O$ | $C_{24}H_{38}O$ | $C_{30}H_{50}O$ |
| Heptamer | $C_{21}H_{30}O$ | $C_{28}H_{44}O$ | Etc. |
| Octamer | $C_{24}H_{34}O$ | Etc. | |
| Nonamer | $C_{27}H_{38}O$ | | |
| Decamer | $C_{30}H_{42}O$ | | |
| Etc. | Etc. | | |
| Series formula. | $C_nH_{2(2m+1)}O$ | $C_nH_{2(3m+1)}O$ | $C_nH_{2(4m+1)}O$ |
| wherein $m$ is an integer of at least 4 and | | | |
| | $n=3m$ | $n=4m$ | $n=5m$ |

Preferably the unsaturated ketones contain not more than 30 carbon atoms and the most preferred compounds are the tetramers and pentamers of lower aliphatic ketones. The unsaturated ketones of the class are of the formula $C_nH_{2[m(k-1)+1]}O$ wherein $m$ and $k$ are each integers with $m$ of at least 4 and $k$ of at least 3 and $n=k\times m$. In this general formula $n$ is related to the number of carbon atoms in the ketone which is at least 12 while $k$ represents the number of carbon atoms in the parent ketone from which the auto-condensate is derived and $m$ is the measure of degree of condensation ($m$ equals 4 with the tetramer, 5 with the pentamer, etc.).

The hydrogenated resins of the invention are obtained by hydrogenating the resinous condensate of an aldehyde with the substituted $\Delta^2$ cyclohexenones. In converting the unsaturated ketones into resinous condensates, formaldehyde is a most preferred reactant in that this compound is more reactive and gives higher yields while the products are of better quality than with other aldehydes. However, other aldehydes may be used, if desired, such as acetaldehyde, propionaldehyde, butyraldehyde, isobutyraldehyde, acrolein, crotonaldehyde, benzaldehyde, etc. Besides the free, uncombined aldehydes, polymers of the aldehydes can be used such as para-formaldehyde, para-aldehyde, meta-aldehyde and the like.

In order to effect the reaction between a higher ketone and an aldehyde, it is necessary to place a mixture of the reactants in contact with a condensing agent or catalyst. For this purpose, any condensing agent may be employed, although some types are more preferable than others, in an amount of from about 0.5 to 5% by weight of the reactants. The preferred catalysts include strong basic condensing agents such as the hydroxides, oxides and alcoholates of the alkali metals as well as strong organic bases like the quaternary ammonium bases. Other less basic agents may be used if desired such as the alkaline earth hydroxides and oxides. In some cases it may be advantageous to employ acidic substances such as sulfuric acid, hydrochloric acid, phosphoric acid, telluric acid, tungstic acid and the like as well as acid salts such as sodium acid sulfate, etc. The catalysts may be employed in the reaction mixture per se or, if desired, they may be used as a solution with a solvent. Suitable organic solvents may be employed for this purpose. Particularly suited are aqueous solutions of the alkali metal hydroxides, the quaternary ammonium bases, the acids and the acid salts.

The higher ketones employed as starting materials in the process are substantially insoluble in water and in aqueous solutions of the aldehydes such as an aqueous solution of the most preferred reactant, formaldehyde. In order that the reaction between the ketones and aldehydes be effected readily, it is desirable that the reaction mixture be in a homogeneous state, i. e. that the reactants and catalyst be in a solution comprising a single phase, at least at the start and early part of the reaction. To this end, a homogenizing solvent is employed in the reaction mixture. In the absence of a homogenizing solvent, the yield of resin is very low. Many solvents are suitable for this purpose and the choice of a particular solvent will depend upon the particular reactants employed, the catalyst used and the presence or absence of water in the mixture. The lower aliphatic alcohols are particularly suitable homogenizing solvents. The amount of these homogenizing solvents employed will depend upon the character of the reaction mixture. In general, sufficient homogenizing solvent is used so that the reaction mixture is homogeneous at least when first heated to effect the reaction.

The homogenizing solvent may serve a two-fold purpose in the process. Besides rendering the reaction mixture homogeneous, it may also be used to regulate the temperature of the reaction mixture during the heating thereof since ordinarily the reaction is effected at not overly high temperatures. By heating the reaction mixture in a vessel fitted with a reflux condenser, the temperature may be made to reach and hold the boiling temperature of the mixture and this may very well be largely dependent upon the refluxing temperature of the homogenizing solvent especially after the reaction has progressed to a considerable extent with substantially no other lower boiling constituents remaining in the mixture. To effect the desired reaction, temperatures, in general, between about 50° C. and 150° C. are employed.

Upon completion of the resin-forming condensation reactions between the ketones and aldehydes, the resin may be recovered from the reaction mixture by several suitable methods. A preferred procedure is to wash the mixture with a catalyst solvent such as water so that the mixture will be substantially freed of the condensing agent. If desired, however, the catalyst may be destroyed by neutralization with an appropriate acidic or basic substance. The mixture may then be distilled, first at higher pressures such as atmospheric to remove the homogenizing solvent, catalyst solvent, unreacted reactants and low-boiling products, and secondly at reduced pressures to remove higher-boiling products from the ketone resin. By completing the distillation operation at very low pressures of 1 to 10 mm. of Hg and at temperatures between about 150° C. and 250° C., but below a temperature at which appreciable thermal decomposition of the resin occurs, the resin is obtained in a hard, brittle, desirable form. Besides the above-outlined scheme of recovery of the resin, other methods may be employed, if desired, such as fractional precipitation, extraction and the like.

The resinous condensates formed according to the foregoing manner are hard, reddish or brown colored, solid, thermoplastic materials which are soluble in common organic solvents. They combine with free oxygen such as from air and thereby undergo a change in solubility in becoming substantially insoluble in paraffinic hydrocarbons. The molecular weight is upwards of about 500. The dark color of the resins makes them unsuitable, however, for certain applications. By subjecting the resins to catalytic hydrogenation, the color is improved and the tendency toward discoloration upon being subsequently heated is decreased as compared to the unhydrogenated resin. In fact, by proper application of the hydrogenation treatment, an essentially water-white resin is obtainable.

The hydrogenation of the resinous condensate is effected at an elevated temperature and pressure of hydrogen in the presence of a hydrogenation catalyst preferably in the liquid phase. The usual hydrogenation catalysts well known to the art are employed to enable the hydrogenation to be attained such as the active metals like nickel, cobalt, iron, platinum, palladium, copper, silver, as well as mixtures of two or more of such metals or catalytically active compounds thereof. If desired, one or more promoters may be used in conjunction with the metals such as chromium, caesium or thorium. The catalysts may be in finely divided form or mounted upon a carrier such as activated charcoal, kieselguhr, activated alumina, pumice, silica gel or the like. Nickel catalysts have given especially desirable results and a preferred catalyst is Raney nickel prepared according to U. S. Patent No. 1,628,190. This catalyst is very active and enables complete hydrogenation at comparatively low temperatures. Other specific catalysts such as nickel prepared by thermal decomposition of nickel formate and the copper chromite catalyst of Calingaert and Edgar (Ind. Eng. Chem. 26, 879 (1934)) are useful.

The resinous condensate is preferably hydrogenated in solution or suspension. For this purpose, a large variety of organic solvents are suitable such as hexane, heptane, octanes, dodecanes, benzene, toluene, xylene, cyclohexane, methyl cyclohexane, ethyl alcohol, isopropyl alcohol, butyl alcohol, diethyl ether, di-isopropyl ether, dioxane, acetone, methyl ethyl ketone, ethyl acetate, butyl acetate, carbon tetrachloride, etc. Preferably the solvent chosen is an unhydrogenatable organic solvent in that it is incapable of undergoing hydrogenation itself under the reaction conditions and substances like benzene and acetone are less preferred than materials which do not absorb hydrogen such as saturated hydrocarbons or alcohols. A solution containing 20 to 60% resin is convenient for the hydrogenation operation although, if desired, the resin can be hydrogenated in the absence of solvent. Hydrogenation of the resin per se without solvent is less preferred since the desired color response is not as good as when the treatment is done in solution and because the material is more easily handled as a solution.

The conditions of hydrogenation are subject to relatively wide variations. While the temperature of operation may vary from about 50 to 300° C., for instance, it is preferable to effect the reaction between about 150° C. and 250° C. The pressure range during the hydrogenation is also subject to variation in that the treatment can be effected at from 1 to 250 atmospheres or higher although it is preferable to use from 100 to 200 atmospheres of hydrogen. The proportion of hydrogenation catalyst used is from 1 to 20 parts per 100 parts of resin.

The time of treatment will vary depending largely upon the conditions, the particular catalyst and the particular resin. In general, the reaction is complete when no more hydrogen is absorbed in the treatment.

To obtain the lightest colored hydrogenated resin, the resinous condensate formed by condensation or reaction of the unsaturated ketone with an aldehyde is kept as much as possible from contact with the air. In general, the resinous condensate is hydrogenated immediately after preparation. The resinous condensates, when there is need for an interval of appreciable time such as several days or more before being hydrogenated, are stored under an atmosphere of inert gas such as carbon dioxide, nitrogen, helium, etc., which is devoid of oxygen. While exposure of the materials to air for a few hours time is not prone to adversely affect the success of the decolorization and stabilization treatment by hydrogenation, exposure for appreciable periods is to be avoided.

The following examples are given for the purpose of further illustrating the invention, but it is to be understood as not limited to any specific details given therein.

*Example I*

About 1240 gms. of xylitone ($C_{12}H_{18}O$) and 565 gms. of 37% aqueous formaldehyde were homogenized with 1100 gms. of methanol to which was added sodium hydroxide (0.5% of total charge) in the form of its 30% aqueous solution. The mixture was warmed cautiously, an exothermic reaction taking place, and finally refluxed for a period of three hours. The methanol was distilled from the mixture and the residue washed with water to remove caustic. Unreacted ketone was then separated by vacuum distillation. The product weighing 800 to 900 gms. was obtained as a residue from this distillation and solidified on cooling to a brittle resin. The physical properties of a sample of the resin were as follows:

| | |
|---|---|
| Per cent carbon | 79.5 |
| Per cent hydrogen | 9.3 |
| Mol. wt | 600 |
| Carbonyl value, equiv. per 100 gm | 0.23 |
| M. P. °C. (mercury) | 70 |
| Color | Orange to red, E to H (rosin scale) |

Hydrogenation of the freshly prepared resin gave a light-colored product of similar properties. An iso-octane solution of the resin was hydrogenated at a temperature between 180 and 250° C. and a pressure between 1500 and 2000 p. s. i. in the presence of Raney nickel until hydrogen was no longer absorbed. After removal of the solvent by distillation the properties of the resin were as follows:

| | |
|---|---|
| Per cent carbon | 80.1 |
| Per cent hydrogen | 11.8 |
| Mol. wt | 580 |
| M. P. °C. (ball and ring) | 71 |
| Color of melt | 3+ (Gardner scale) |

*Example II*

About 890 gms. of unsaturated ketones obtained as by-product in condensing acetone to form isophorone which contained 12, 15 and 18 carbon atoms, 405 gms. of 37% formalin, 810 gms. of methanol to homogenize and 75 gms. of 30% aqueous sodium hydroxide warmed to about 35° C. when mixed and was then heated slowly to about 70° C. at which refluxing temperature it was kept for 3 hours. During the next ½ hour about 500 gms. of methanol was distilled from the reaction mixture. The residue was washed with 1500 cc. of hot water and the resinous mixture was dissolved in 500 cc. of isopropanol. Part of the prepared solution was hydrogenated at about 150° C. under 1500–2000 p. s. i. pressure for 1½ hours using Raney nickel catalyst. The hydrogenation was not sufficiently complete and better results with respect to color would have been obtained by separating unreacted ketones prior to the hydrogenation treatment. The hydrogen treated portion and the unhydrogenated sample were separately distilled in a gooseneck flask to 100° C. under 2½ mm. pressure. The hydrogenated resin was red in color while the unhydrogenated material was black indicating the improvement obtained towards discoloration by heating with the hydrogen treatment.

*Example III*

About 178 gms. of 12 carbon atom unsaturated ketone (xylitone) from condensation of mesityl oxide which were kept under an atmosphere of nitrogen gas, 81 gms. of 37% aqueous formaldehyde, 5 gms. of 30% aqueous sodium hydroxide and 95 gms. of methanol were refluxed for 2 hours. The mixture was then washed with water and unreacted ketone distilled therefrom at reduced pressure. The recovered resin was kept under nitrogen and dissolved in an equal weight of dodecane, the color of the solution being about 9½ Gardner. The solution was subjected to hydrogenation using Raney nickel as catalyst under the following conditions: time=7 hours; temperature=170–265° C., hydrogen pressure=1250–1880 p. s. i. The solution was colorless after the treatment which ended when hydrogen was no longer absorbed. It was found that some water was formed. The mixture was distilled under a vacuum to a temperature of 140° C. at 2–3 mm. pressure, the kettle temperature reaching 190° C. The hydrogenated resin recovered was nearly colorless with only a yellowish trace, being better than X (Extra) on the rosin scale. The unhydrogenated resinous condensate had a color of about H on the rosin scale.

The hydrogenated resins of the invention are very useful substances. They may be employed in coating compositions, impregnating compositions, film-forming compositions and the like as well as for electrical insulation, manufacturing molded articles and numerous other miscellaneous uses, for instance, as a binder for printing inks and as a chicle substitute for chewing gum.

We claim as our invention:

1. In a method of improving color qualities of a resinous condensate obtained by reacting an aldehyde at an elevated temperature in the presence of a condensing agent with a lower aliphatic ketone, having hydrogen on the alpha carbon atom, auto-condensation product which is a substituted Δ²-cyclohexenone of the formula

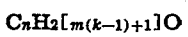

$$C_nH_{2[m(k-1)+1]}O$$

wherein $m$ and $k$ are each integers with $m$ of at least 4 and $k$ of at least 3 and $n = k \times m$, the step which comprises hydrogenating said resinous condensate in the presence of a hydrogenation catalyst.

2. The step according to claim 1 wherein the resinous condensate is subjected to the hydrogenation treatment substantially immediately after the preparation of said resinous condensate.

3. In a method of obtaining a resinous body approaching a water-white color from a resinous condensate obtained by reacting formaldehyde at an elevated temperature in the presence of a condensing agent with a lower aliphatic ketone, having hydrogen on the alpha carbon atom, auto-condensation product which is a substituted Δ²-cyclohexenone of the formula

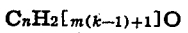

$$C_nH_{2[m(k-1)+1]}O$$

wherein $m$ and $k$ are each integers with $m$ of at least 4 and $k$ of at least 3 and $n = k \times m$ but not greater than 30, the step which comprises hydrogenating said resinous condensate in the presence of a nickel hydrogenation catalyst at a temperature between 150 and 250° C. and under a hydrogen pressure between 100 and 200 atmospheres until hydrogen consumption by the reaction mixture is substantially complete, said resinous condensate being dissolved in an organic solvent when it is hydrogenated.

4. The step according to claim 3 wherein contact of the resinous condensate with air is avoided and it is kept in an inert atmosphere essentially devoid of molecular oxygen following preparation of the resinous condensate and before subjection of it to the hydrogenation treatment.

5. In a method of improving color qualities of a resinous condensate obtained by reacting an aldehyde at an elevated temperature in the presence of a condensing agent with a substituted $\Delta^2$-cyclohexenone which is an auto-condensation product of acetone and is of the formula $$C_nH_{2(2m+1)}O$$

wherein $m$ is an integer of at least 4 and $n=3m$, the step which comprises hydrogenating said resinous condensate in the presence of a hydrogenation catalyst.

6. In a method of improving color qualities of a resinous condensate of formaldehyde with an unsaturated ketone auto-condensation product of acetone of the formula $C_nH_{2(2m+1)}O$ wherein $m$ is an integer of at least 4 and $n=3m$ but is no greater than 30, the step which comprises hydrogenating said resinous condensate at a temperature between 50 and 300° C. and a superatmospheric pressure of hydrogen in the presence of a hydrogenation catalyst, said resinous condensate being dissolved in an organic solvent when it is hydrogenated.

7. In a method of obtaining a resinous body approaching a water-white color from a resinous condensate of formaldehyde with a xylitone, the step which comprises hydrogenating said resinous condensate in the presence of a nickel hydrogenation catalyst at a temperature between 150 and 250° C. and under a hydrogen pressure between 100 and 200 atmospheres until hydrogen absorption of the reaction mixture is substantially ceased, said resinous condensate being dissolved in a saturated hydrocarbon solvent when it is hydrogenated.

8. In a method of improving color qualities of a resinous condensate obtained by reacting an aldehyde at an elevated temperature in the presence of a condensing agent with a substituted $\Delta^2$-cyclohexenone which is an auto-condensation product of methyl ethyl ketone and is of the formula $C_nH_{2(3m+1)}O$ wherein m is an integer of at least 4 and $n=4m$, the step which comprises hydrogenating said resinous condensate in the presence of a hydrogenation catalyst.

9. In a method of improving color qualities of a resinous condensate obtained by reacting formaldehyde at an elevated temperature in the presence of a condensing agent with a homoxylitone of methyl ethyl ketone, the step which comprises hydrogenating said resinous condensate in the presence of a nickel hydrogenation catalyst at a temperature between 150 and 250° C. and a pressure between 100 and 200 atmospheres until hydrogen consumption of the reaction mixture is substantially complete, said resinous condensate being dissolved in an organic solvent when it is hydrogenated.

10. A hydrogenated resin obtained by hydrogenating a resinous condensate which was obtained by reacting an aldehyde at an elevated temperature in the presence of a condensing agent with a lower aliphatic ketone, having hydrogen on the alpha carbon atom, auto-condensation product which is a substituted $\Delta^2$-cyclohexenone of the formula $$C_nH_{2[m(k-1)+1]}O$$

wherein $m$ and $k$ are each integers with $m$ of at least 4 and $k$ of at least 3 and $n=k\times m$, said hydrogenated resin having superior resistance to discoloration upon being heated than said resinous condensate.

11. A hydrogenated resin obtained by hydrogenating a resinous condensate which was obtained by reacting formaldehyde at an elevated temperature in the presence of a condensing agent with a lower aliphatic ketone, having hydrogen on the alpha carbon atom, auto-condensation product which is a substituted $\Delta^2$-cyclohexenone of the formula $C_nH_{2[m(k-1)+1]}O$ wherein $m$ and $k$ are each integers with $m$ of at least 4 and $k$ of at least 3 and $n=k\times m$ but not more than 30, said hydrogenated resin being of better color and having superior resistance to discoloration upon being heated than said resinous condensate.

12. A hydrogenated resin obtained by hydrogenating a resinous condensate which was obtained by reacting an aldehyde at an elevated temperature in the presence of a condensing agent with a substituted $\Delta^2$-cyclohexenone which is an auto-condensation product of acetone and is of the formula $C_nH_{2(2m+1)}O$ wherein $m$ is an integer of at least 4 and $n=3m$, said hydrogenated resin having superior resistance to discoloration upon being heated than said resinous condensate.

13. A hydrogenated resin obtained by hydrogenating a resinous condensate which was obtained by reacting formaldehyde at an elevated temperature in the presence of a condensing agent with a substituted $\Delta^2$-cyclohexenone which is an auto-condensation product of acetone and is of the formula $C_nH_{2(2m+1)}O$ wherein $m$ is an integer of at least 4 and $n=3m$ but is not greater than 30, said hydrogenated resin having superior resistance to discoloration upon being heated than said resinous condensate.

14. A hydrogenated resin obtained by hydrogenating a resinous condensate which was obtained by reacting formaldehyde at an elevated temperature in the presence of a condensing agent with xylitone, said hydrogenated resin being less discolored and having superior resistance to discoloration upon being heated than said resinous condensate.

15. A hydrogenated resin obtained by hydrogenating a resinous condensate which was obtained by reacting an aldehyde at an elevated temperature in the presence of a condensing agent with a substituted $\Delta^2$-cyclohexenone which is an auto-condensation product of methyl ethyl ketone and is of the formula $$C_nH_{2(3m+1)}O$$

wherein $m$ is an integer of at least 4 and $n=4m$, said hydrogenated resin having superior resistance to discoloration upon being heated than said resinous condensate.

16. A hydrogenated resin obtained by hydrogenating a resinous condensate which was obtained by reacting formaldehyde at an elevated temperature in the presence of a condensing agent with a substituted $\Delta^2$-cyclohexenone which is an auto-condensation product of methyl ethyl ketone and is of the formula $C_nH_{2(3m+1)}O$ wherein $m$ is an integer of 4 to 7 and $n=4m$, said hydrogenated resin possessing less tendency to discolor upon being heated than said resinous condensate.

17. A hydrogenated resin obtained by hydrogenating a resinous condensate which was obtained by reacting formaldehyde at an elevated temperature in the presence of a condensing agent with a homoxylitone of methyl ethyl ketone, said hydrogenated resin being of lighter color and having superior resistance to discoloration upon being heated than said resinous condensate.

SEAVER A. BALLARD.
VERNON E. HAURY.